March 2, 1948.  H. L. SCHUG  2,436,939
MAGNETIC COUPLING AND BEARING
Filed Oct. 21, 1943  2 Sheets-Sheet 1

Inventor
Howard L. Schug
by Harry S. Dumaser
Attorney

March 2, 1948.  H. L. SCHUG  2,436,939
MAGNETIC COUPLING AND BEARING
Filed Oct. 21, 1943  2 Sheets-Sheet 2

Inventor
Howard L. Schug
by Harry S. Dumarse
Attorney.

Patented Mar. 2, 1948

2,436,939

UNITED STATES PATENT OFFICE 2,436,939

MAGNETIC COUPLING AND BEARING

Howard L. Schug, Palo Alto, Calif., assignor to The Hoover Company, North Canton, Ohio, a corporation of Ohio Application October 21, 1943, Serial No. 507,097

9 Claims. (Cl. 172—284)

This invention relates to refrigeration and more particularly to a magneto-motive device for driving the medium circulator of an absorption refrigerating machine.

According to one aspect of the invention of the present application the repelling action of like magnetic poles is utilized to drive the circulator, to center it in its housing and to carry its weight so that there is no necessity for either lubrication or bearings.

According to another aspect of the present invention the repelling action of like magnetic poles is utilized to center the rotor of an electric motor in its casing and to carry the weight thereof to eliminate the bearing and lubrication problems.

According to the broadest aspects of the present invention, a magneto-motive device is maintained in stable equilibrium by the repelling action of like magnetic poles.

Other objects and advantages of this invention will become apparent when taken in connection with the accompanying drawings, in which.

Figure 1:
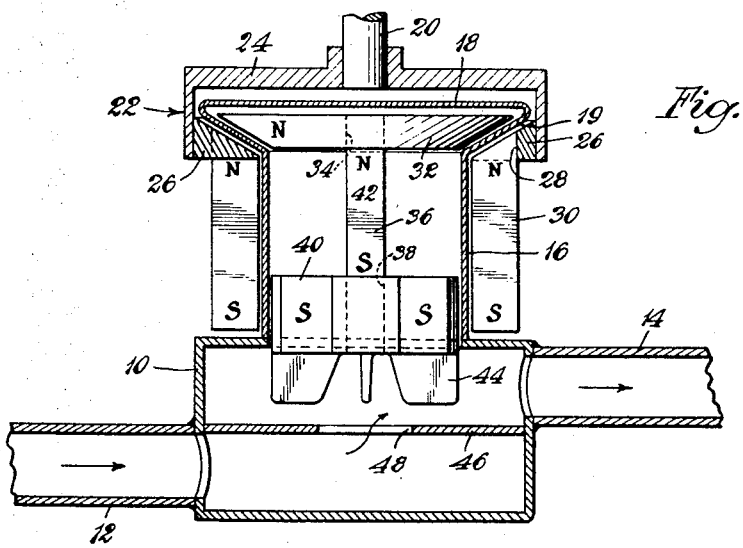
Figure 1 is a vertical sectional view of one modification of the invention.
Figure 2:
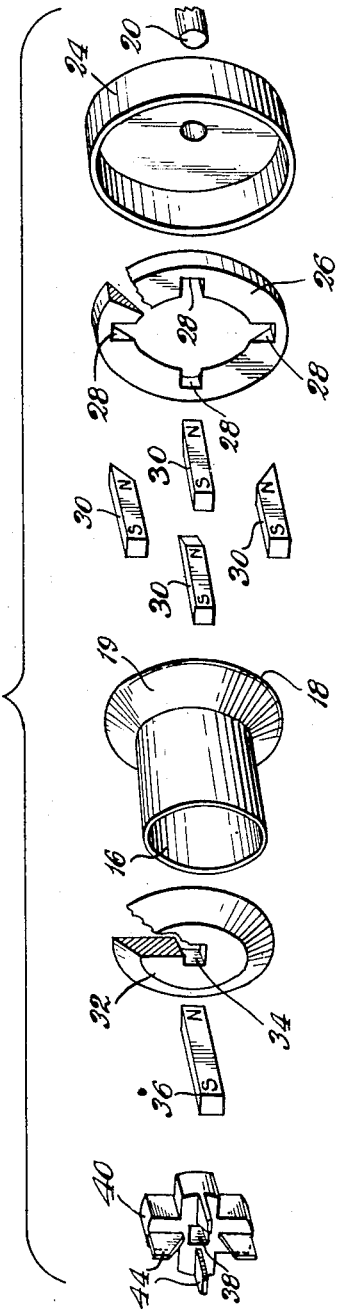
Figure 2 is an exploded view showing the relationship of the various parts of the device of Figure 1.

Referring to Figures 1 and 2, the reference numeral 10 represents a fan casing with intake and exhaust conduits 12 and 14, respectively, extending therefrom, which conduits form part of the inert gas circuit of a three-fluid absorption refrigerating apparatus. A thin shell 16 preferably made of non-magnetic material such as certain types of stainless steel is welded or otherwise hermetically sealed to the casing 10 so as to seal hermetically the fan casing from the atmosphere. The shell 16 has welded or otherwise secured thereto an enlarged upper portion 18 having an angular wall 19 for a purpose to be disclosed hereinafter.

Rotatably mounted on the exterior of the shell 16 by means of a rotating shaft 20 is a magnetic driver generally indicated by the reference numeral 22. The motor (not shown) which drives the shaft 20 may be mounted on the casing 10 in any suitable manner or otherwise supported so as to rotate the driver magnet 22 concentrically about the shell 16.

The shaft 20 is secured to the driver magnet 22 by means of a spider or dish member 24 of non-magnetic material such as certain types of stainless steel. The member 24 may be pressed over or otherwise secured to a ring-shaped pole piece 26 of highly magnetic material such as soft iron or magnetic stainless steel. The ring-shaped pole piece 26 constitutes a part of the driver magnet 22 and is thicker at its outer periphery, as shown in Figure 1, so as to present a pole face extending at an angle to the horizontal for a purpose to be described hereinafter.

Press fitted into openings 28 in the ring-shaped pole piece 26 is a plurality of permanent magnets 30 spaced circumferentially about the periphery of the ring-shaped pole piece 26. The magnets 30 extend perpendicularly from the bottom face of the pole piece 26 and extend downwardly closely adjacent the outer wall of the shell 16 while the upper angular face lies closely adjacent the angular wall 19 of the enlargement 18.

The magnets 30 have all their like poles, for example, their north poles as shown, pressed into the openings 28 in the pole piece 26 while their south poles are free. If desired, the south poles may also be connected by a ring of non-magnetic material so as to support them against movement relative to each other.

On the interior of the enlarged portion 18 of the shell 16 is a disc-shaped pole piece 32 of highly magnetic material preferably soft iron or certain types of magnetic stainless steel having an angular face extending parallel to the angular face of the pole piece 26 and lying closely adjacent thereto on the interior of the angular wall 19 of the enlargement 18 of the shell 16.

Pressed into an opening 34 in the center of the pole piece 32 is a permanent magnet 36. At its bottom end the magnet 36 is pressed into an opening 38 in a salient pole piece 40 having the same number of poles as there are magnets 30. The magnet 36 has its end having the same polarity as the upper end of the poles 30 pressed into the pole piece 32 while the end of opposite polarity is pressed into the pole piece 40. As shown, the north pole is pressed into the pole piece 32 and the south pole in the pole piece 40 so that the pole piece 32 has the same polarity as the pole piece 26 and the pole piece 40 the same polarity as the lower ends of the magnets 30.

The magnet 36 and the pole pieces 32 and 40 constitute a magnetic follower, generally indicated by the reference numeral 42. Secured to the lower end of the follower 42 and extending into the casing 10 is a centrifugal fan 44 of any suitable construction. The chamber 10 is divided into a suction chamber and a discharge chamber by a partition 46 having an opening 48 leading to the eye of the fan 44.

In operation, when the shaft 20 is rotated the south poles of the magnets 30 will repel the south poles formed in the pole piece 40 and rotate the follower 42 within the shell 16 so as to rotate the fan 44 and circulate the inert gas in its circuit.

The pole pieces 26 and 32 are of the same polarity and due to the fact that they have inclined parallel faces closely adjacent each other with one above the other, their repelling forces will have both horizontal and vertical components. The horizontal components of these forces will center the upper end of follower 42 in the enlargement 18 while the vertical components will carry the weight of the follower 42 both while it is stationary and while rotating.

The angularity of the parallel faces of the pole pieces 26 and 32 is so chosen that the vertical component of the repelling force will just carry the weight of the follower 42 clear of the interior of the enlargement 18 of the shell 16.

The poles formed in the pole piece 40 being of the same polarity as the lower ends of the magnets 30, the repelling magnetic force thus produced will also center the lower end of the follower 42 within the shell 16. Thus the follower is floatingly suspended for rotation on the interior of the shell 16 and does not require bearings or lubrication.

The rotor or follower 42 is suspended in a position of stable equilibrium in all directions since any force such as the reactive force of the fan 44 tending to force it out of equilibrium will increase the restoring force. Thus if a force tends to move the follower 42 downwardly, the angular faces of the pole pieces 26 and 32 will come closer together and increase the vertical component of the repelling force which will tend to restore the follower 42 to its original position. Similarly, if the follower is forced to the right or to the left, the follower 42 will come closer to the driver 22 at one point and farther away at another. This will increase the repelling force at its closest side and decrease it at the widest side, and thus increase the force tending to restore the follower 42 to a central position.

The fact that the pole pieces 26 and 32 having the opposed angular pole faces are positioned at the top of the follower also contributes to the stability of the centering action because of the pendulum action which tends to center the lower end of the follower. However, if desired, the angular faced pole pieces may be placed at the bottom of the follower 42 instead of at the top and the repelling action of the opposed like poles would still center the follower 42 within the shell 16.

Also, if desired, the pole pieces 26 and 32 may have their faces parallel to each other in a vertical direction, in which case a thrust bearing would be necessary but the follower 42 would still be centered in the shell 16 by the repelling action of like poles.

The fact that like poles are opposed has a tendency to demagnetize the magnets. However, the material "Alnico" has very high magnetic retentivity and will operate in the manner described for very long periods of time without becoming demagnetized. "Alnico" is well known and is an alloy of aluminum, nickel, iron and cobalt.

While the pressures in three-fluid absorption refrigerating machines is quite high, it has been found that if the shell 16 is made of high strength non-magnetic steel it can be made very thin and still withstand those high pressures in view of the fact that the diameter of the shell 16 is very small, being in the neighborhood of 1¼ to 1½ inches in diameter.

The pressures within the three-fluid refrigerating system are substantially equalized throughout all parts of the apparatus and only a small pressure difference need be produced to circulate all of the mediums in their circuits. It has been found that a pressure difference of only 4 inches of water is sufficient for the purpose. Thus the magnetic transmission need not be made large and permanent magnets of the type desired are readily available for the purpose.

The magnetic transmissions of the type disclosed herein have very high pull-out torques and are very well suited for the purpose. The iron pole pieces secured to the permanent magnet 36 also produce a high pull-in torque due to the fact that the eddy current and hysteresis effect produced in the follower tend to pull the follower into step with the driver.

This invention in its broadest aspect is not limited to magnetic transmission, since it could be employed as well for centering and carrying the weight of the rotor of an electric motor. Such an application is shown in Figures 3 and 4.

Figure 3:
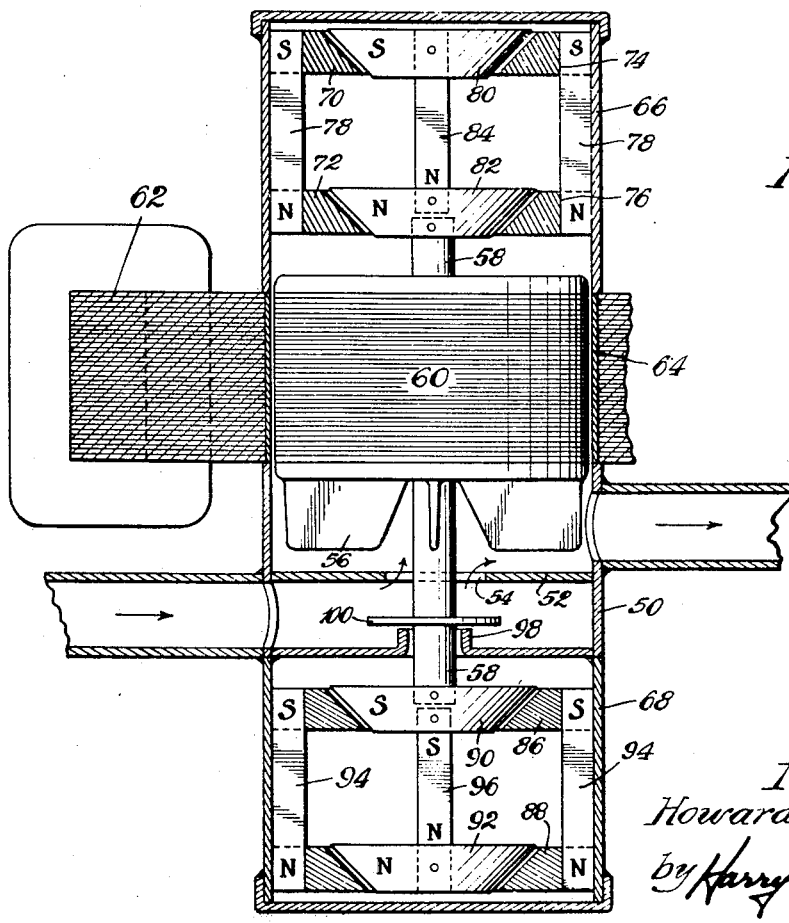
Figure 3 is a vertical sectional view of another modification of the invention.
Figure 4:
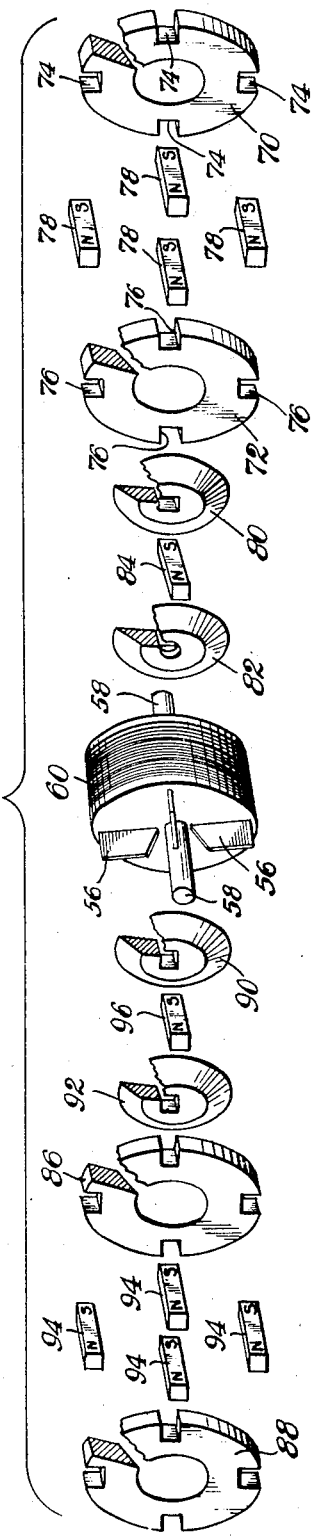
Figure 4 is an exploded view showing the arrangement of the parts of the device of Figure 3.

Referring to Figures 3 and 4, the fan housing 50 is divided into suction and discharge chambers by a partition 52 having an opening 54 leading to the eye of the centrifugal fan 56. The fan is carried by a shaft 58 which is adapted to be rotated by an electric motor having a rotor 60 and a stator 62. The rotor 60 and stator 62 are separated by a thin shell 64 of magnetic material, preferably stainless steel, welded or otherwise hermetically sealed to the casing 50. The shell 64 should be separated from the fan casing 50 by an annulus of non-magnetic stainless steel (not shown). Extending above the shell 64 and below the casing 50 are closed annular housings 66 and 68 of non-magnetic stainless steel welded to the shell 64 and the casing 50 respectively.

Within the housing 66 are a pair of vertically spaced annular pole pieces 70 and 72 of soft magnetic iron or steel. Pressed into circumferentially spaced openings 74 and 76 in the periphery of the pole pieces 70 and 72 are a plurality of permanent magnets 78 made of "Alnico." The magnets 78 have their ends of like polarity all facing in the same direction. As shown, the south poles are pressed into the openings 74 of the pole piece 70 and the north poles into the openings 76 in the pole piece 72. The annular pole pieces 70 and 72 have their inner periphery cut at an angle to the horizontal with the resulting angular faces facing upwardly as shown.

Within the annular pole pieces 70 and 72 are a pair of disc-shaped pole pieces 80 and 82 having their outer periphery cut at an angle with the annular faces facing downwardly and lying parallel to the angular faces of the pole pieces 70 and 72 and spaced slightly therefrom. Pressed into the central openings in the pole pieces 80 and 82 is a permanent magnet 84 of "Alnico," having its south pole pressed into the pole piece 80 and its north pole pressed into the opening of the pole piece 82 so that the pole piece 80 has the same polarity as the pole piece 70 and the pole piece 82 has the same polarity as the pole piece 72. If desired, the polarity of the magnets 78 and 84 may be reversed but the pole pieces at opposite ends should have the same polarity. The pole piece 82 is secured to the shaft 58, which is made of some non-magnetic material such as magnetic stainless steel, in any suitable manner.

Similarly pole pieces 86, 88, 90 and 92 and "Alnico" magnets 94 and 96 are mounted within the housing 68 with the pole piece 90 being secured to the lower end of the shaft 58.

In order to prevent any liquid from entering the housing 68, the bottom of casing 50 has an upstanding rib 98 and a throw-off ring 100 is mounted on the shaft 58 immediately above the upstanding rib 98.

The magnets 78, 84, 94 and 96 induce south poles in the pole pieces 70, 80, 86 and 90 and north poles in the pole pieces 72, 82, 88 and 92 so that the rotating poles of like polarity are juxtaposed to like stationary poles. The angular faces of the opposed like poles cause the repelling force to have both vertical and horizontal components so that the horizontal components center the rotor 60 within the shell 64 and the vertical component acts to carry the weight of the rotor 60. The strength of the magnets 78, 84, 94 and 96 and the angularity of the angular faces of pole pieces 70, 80, 72, 82, 86, 90, 88 and 92 are so chosen that the vertical components of the repelling forces are just sufficient to carry the weight of the rotor 60 both while rotating and while stationary with the angular faces of the juxtaposed pole pieces just clearing so that the rotor is in effect floatingly suspended.

In this case also the rotary element, including the rotor 60, the pole pieces 80, 82, 90 and 92 and the magnets 94 and 96 is held in stable equilibrium. Any force such as the reactive force of the rotor 60 tending to move the rotating element from equilibrium increases the force tending to restore it, as in the first modification.

If desired, the bottom pole pieces may have their pole faces lying parallel in a vertical plane so that they exert no real lifting action but merely serve to center the rotor 60 within the shell 64. Also, if desired, the lower assembly within the housing 58 may be omitted in which case a radial bearing would be necessary to hold the lower end of the rotor 60 in central position.

As in the first modification, the modification just described eliminates both the bearing and lubrication problems and the rotor is floatingly suspended in a state of stable equilibrium while rotating and while stationary.

From the foregoing it can be seen that the repelling action of like magnetic poles is utilized to drive the rotor of a magneto-motive device, to center its rotor and to carry its weight in which the rotor is always held in a position of stable equilibrium both while rotating and while stationary.

While I have shown but two embodiments of my invention, it is to be understood that these embodiments are to be taken as illustrative only and not in a limiting sense. I do not wish to be limited to the specific structure shown and described but to include all equivalent variations thereof except as limited by the scope of the claims.

I claim:

1. A magneto-drive device comprising, an annulus of magnetic material, circumferentially arranged axially extending magnet means secured to said annulus, said magnet means having opposite poles at opposite ends, and a pair of magnetic discs connected by magnet means rotatably mounted within said annulus and said axially extending magnet means, said second magnet means having its north and south poles at the same ends as said first magnet means.

2. A magneto-motive device comprising, an annulus of magnetic material, circumferentially arranged axially extending magnet means secured to said annulus, said magnet means having opposite poles at opposite ends, and a pair of magnetic discs connected by magnet means rotatably mounted within said annulus and said axially extending magnet means, said second magnet means having its north and south poles at the same end as said first magnet means, the arrangement being such that said discs and second magnet means are maintained in stable equilibrium by the repulsive forces exerted by both of said magnet means.

3. A magneto-motive device comprising, an annulus of magnetic material, circumferentially arranged axially extending magnet means secured to said annulus, said magnet means having opposite poles at opposite ends, and a pair of magnetic discs connected by magnet means rotatably mounted within said annulus and said axially extending magnet means, said second magnet means having its north and south poles at the same end as said first magnet means, the arrangement being such that the weight of said discs and second magnet means is carried by the repulsive force exerted by both of said magnet means.

4. A magneto-motive device comprising, an annulus of magnetic material circumferentially arranged axially extending magnet means secured to said annulus, said magnet means having opposite poles at opposite ends, a pair of magnetic discs connected by magnet means rotatably mounted within said annulus and said axially extending magnet means, said second magnet means having its north and south poles at the same end as said first magnet means and means for rotating said annulus and said first magnet means.

5. A magneto-motive device comprising, an annulus of magnetic material, circumferentially arranged axially extending magnet means secured to said annulus, said magnet means having opposite poles at opposite ends, and a plurality of magnetic discs connected by magnet means rotatably mounted within said annulus and said axially extending magnet means, said second magnet means having its north and south poles at the same end as said first magnet means, said annulus and one of said discs having their inner and outer peripheries cut at an angle and being positioned with the annular surfaces thus formed lying in a juxtaposed position so that the repulsive action of the poles formed therein will both act to center and carry the weight of said discs and said second magnetic means.

6. A magneto-motive device comprising, an annulus of magnetic material, circumferentially arranged axially extending magnet means secured to said annulus, said magnet means having opposite poles at opposite ends, and a pair of magnetic discs connected by magnet means rotatably mounted within said annulus and said axially extending magnet means, said second magnet means having its north and south poles at the same end as said first magnet means, said annulus and one of said discs having their inner and outer peripheries cut at an angle with the annular surfaces thus formed lying in juxtaposed position so that the repulsive action of the poles formed thereon will both act to center and to carry the weight of said discs and second magnet means, said annulus being positioned at the top of said first magnet means whereby said discs and second magnet means are suspended by the repulsive action of said magnet means.

7. A magneto-motive device comprising, two elongated magnetized bodies having dissimilar poles at opposite ends thereof, one of said bodies being annular and the other of said bodies being rotatably mounted within said annular body with its poles in juxtaposition to the poles of said annular body, said juxtaposed poles having the same polarity, a second similar magneto-motive device spaced axially of the first magneto-motive device and being connected thereto by a shaft of non-magnetic material both of said magneto motive devices acting in an upward direction to floatingly carry the weight of said rotatably mounted body.

8. A magneto-motive device comprising, two elongated magnetized bodies having dissimilar poles at opposite ends thereof, one of said bodies being annular and the other of said bodies being rotatably mounted within said annular body with its poles in juxtaposition to the poles of said first body, said juxtaposed poles having the same polarity, a second similar magneto-motive device spaced axially of said first magneto-motive device and being connected thereto by a shaft of non-magnetic material and a rotor of an electric motor mounted on said shaft between said magneto-motive devices both of said magneto motive devices acting in an upward direction to floatingly carry the weight of said rotatably mounted body.

9. A magneto-motive device comprising, a pair of stationary soft-iron axially spaced annuli, a second pair of stationary soft-iron axially spaced annuli spaced axially from said first pair of annuli, a plurality of permanent magnets having ends of opposite polarity secured at their opposite ends circumferentially of an annulus of each pair of annuli so as to secure each pair of annuli together and to form two axially spaced stationary annular magnets each having angular cylindrical pole faces of opposite polarity with the faces of like polarity extending in the same direction, a pair of rotatable soft-iron axially spaced discs on the interior of each of said axially spaced stationary annular magnets, each pair of said discs being secured together by an axially extending permanent magnet having ends of opposite polarity so as to form two axially spaced cylindrical magnets having angular cylindrical faces of opposite polarity with the faces of the same polarity extending in the same direction, the arrangement being such that the north poles of the cylindrical magnets are juxtaposed to north poles of the annular magnets and south poles of the cylindrical magnets are juxtaposed to south poles of the annular magnets and a rotor of an electric motor mounted between said axially spaced cylindrical magnets for rotation therewith.

HOWARD L. SCHUG.

REFERENCES CITED

The following references are of record in the file of this patent:

UNITED STATES PATENTS

| Number | Name | Date |
|---|---|---|
| 2,254,698 | Hansen | Sept. 2, 1941 |
| 2,243,555 | Faus | May 27, 1941 |
| 2,377,175 | Peer | May 29, 1945 |
| 2,414,688 | Chambers | Jan. 21, 1947 |
| 1,896,972 | Redmond | Feb. 7, 1933 |
| 2,325,915 | Naul | Aug. 3, 1943 |
| 2,241,983 | Connolly | May 13, 1941 |
| 2,373,609 | Stahl | Apr. 10, 1945 |
| 2,256,937 | Beams | Sept. 23, 1941 |
| 2,311,382 | Hansen | Feb. 16, 1943 |
| 2,315,408 | Faus | Mar. 30, 1943 |